Patented July 16, 1940

2,208,363

UNITED STATES PATENT OFFICE 2,208,363

MONOAZO DYESTUFFS INSOLUBLE IN WATER

Ernst Fischer, Offenbach-on-the-Main, Germany, assignor to General Aniline & Film Corporation, a corporation of Delaware No Drawing. Application February 4, 1939, Serial No. 254,533. In Germany February 11, 1938

5 Claims. (Cl. 260—203)

The present invention relates to mono-azo dyestuffs insoluble in water; more particularly, it relates to dyestuffs of the following general formula:

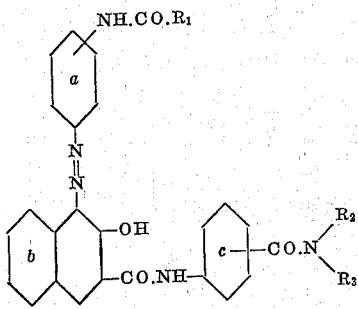

wherein the group —NH.CO.R$_1$ stands in meta- or para-position to the azo-group, the benzene radical $a$ may contain as further substituents alkyl-, alkoxy-groups or halogen, R$_1$ means an alkyl-, aralkyl-, aryl- or a hydroaromatic radical, R$_2$ and R$_3$ represent alkyl-, aralkyl-, aryl- or hydroaromatic radicals which may be connected to form a heterocyclic ring system, and wherein the naphthalene radical may contain as substituents in $b$ an alkoxy-group or halogen and the benzene radical $c$ may contain an alkyl-, alkoxy-, aralkoxy, aryloxy-group or halogen.

I have found that valuable pigment dyestuffs are obtainable by coupling a diazo-compound from an amine of the general formula:

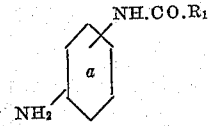

wherein the group —NH.CO.R$_1$ stands in meta- or para-position to the amino-group, the benzene radical $a$ may contain as further substituents alkyl-, alkoxy-groups or a halogen and wherein R$_1$ means an alkyl-, aralkyl-, aryl- or a hydroaromatic radical, with an arylide of 2-hydroxy-naphthalene-3-carboxylic acid of the following general formula:

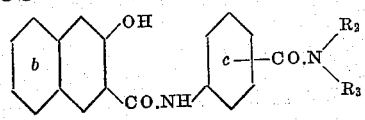

wherein R$_2$ and R$_3$ represent alkyl-, aralkyl-, aryl- or hydroaromatic radicals, which may be connected to form a heterocyclic ring system, and wherein the naphthalene radical may contain as substituents in $b$ an alkoxy-group or halogen and the benzene radical $c$ may contain an alkyl-, alkoxy-, aralkoxy- or aryloxy-group or halogen, only such dyestuff components being used as do not contain any group lending solubility in water.

The new dyestuffs yield red to blue shades of good properties of fastness. They are insoluble in water, but very easily soluble in many organic solvents, for instance, hydrocarbons, alcohols, esters, ketones and, therefore, can be used for coloring these solvents as well as the lacquers prepared by means of these solvents, for instance, nitro- or acetyl-cellulose lacquers, films or plastic masses. They are also especially suitable for coloring varnishes, candles and fats. Owing to the different substituents present in the dyestuffs the suitability of the organic solvents named varies, but the most suitable solvents may easily be ascertained by experiment.

In comparison with the dyestuffs which are described in German patent specifications Nos. 649,010 and 651,202, for the production of fast dyeings on high-molecular, organic, plastic masses and contain as coupling components 2.3-hydroxynaphthoylaminobenzene-carboxylic acid amides containing in the amide radical free hydrogen atoms, the dyestuffs obtainable by the present invention are distinguished by their enhanced solubility in organic solvents so that they are very suitable for coloring bodies of the kind named above, whereas the dyestuffs of the aforesaid patent specifications have either no solubility in organic solvents or a solubility too small for these purposes.

The following examples serve to illustrate the invention, but they are not intended to limit it thereto; the parts are by weight:

1. 12.8 parts of 1-amino-2-methoxy-5-methyl-4-benzoyl-aminobenzene are diazotized in the usual manner. Thereupon sodium acetate is added to the diazo-solution in order to bind the mineral acid in excess and the diazo-solution is then stirred into a solution of 23.4 parts of 2.3-hydroxynaphthoyl-1'-amino-2'-methoxybenzene-5'-(carbonyl-N-(n)butylphenylamine) in dilute caustic soda solution. When the coupling is complete, the dyestuff obtained is filtered with suction, washed well and dried. It is a red powder which dissolves easily in butyl alcohol, butyl acetate and other organic solvents and colors cellulose ester lacquers vivid bordeaux-red tints of good properties of fastness. The dyestuff corresponds with the following formula:

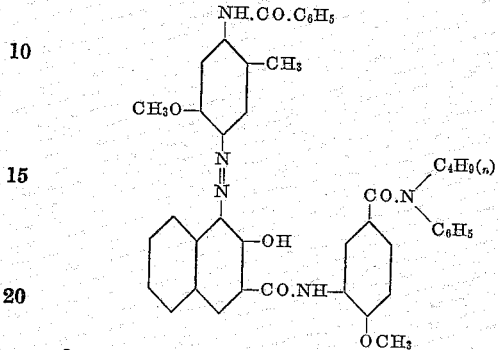

2. 15 parts of 1-amino-2.5-diethoxy-4-benzoylaminobenzene are diazotized in the usual manner. The diazo-solution which has been made neutral to Congo paper by means of sodium acetate is stirred into a solution of 21.6 parts of 2.3-hydroxynaphthoyl-1′-amino-2′-methylbenzene-5′-(carbonyl-n-dibutylamine) in dilute caustic soda solution. The dyestuff obtained is filtered with suction, washed well and dried. It dissolves easily in butyl acetate, xylene and other organic solvents and colors lacquers vivid blue tints of good fastness to light.

3. By using in Example 2 instead of 21.6 parts of 2.3-hydroxynaphthoyl - 1′ - amino-2′-methylbenzene - 5′ - (carbonyl - n - dibutylamine), 23.4 parts of 2.3-hydroxynaphthoyl - 1′ - amino-2′-methoxybenzene-5′-(carbonyl-N-(n)-butylphenylamine) a dyestuff of similarly good properties of fastness is obtained which colors the various organic solvents and the lacquers prepared therewith violet tints.

4. A pigment-dyestuff is prepared in the manner described in Examples 1 and 2 from the diazo-compound of 15 parts of 1-amino-2.5-diethoxy-4-benzoylaminobenzene and 18.7 parts of 2.3 - hydroxynaphthoyl - 1′ - aminobenzene - 4′ - (carbonyl-N-piperidine). It dissolves easily in butyl alcohol and in xylene and colors cellulose ester lacquers blue tints of good fastness to light.

5. From the diazo-compound from 12 parts of 1-amino - 2.4 - dimethyl - 5 - benzoylaminobenzene and 23.4 parts of 2.3 - hydroxynaphthoyl-1′-amino-2′-methoxybenzene - 5′ - (carbonyl-N-(n) butylphenylamine) a red dyestuff is obtained in the manner described in Examples 1 and 2. It dissolves easily in organic solvents and colors cellulose ester lacquers red tints of good fastness to light.

The following table indicates a number of other mono-azo dyestuffs obtainable by the invention.

| | Diazo-compound from— | Coupled with— | Shade |
|---|---|---|---|
| 1 | 1-amino-2.5-diethoxy-4-benzoylaminobenzene | 2.3-hydroxynaphthoyl-1′-amino-benzene-2′-(carbonyl-N-benzyl-phenylamine) | Violet. |
| 2 | 1-amino-2.5-diethoxy-4-benzoylaminobenzene | 2′-ethoxybenzene-5′-(carbonyl-n-dibutylamine) | Do. |
| 3 | 1-amino-2.4-dimethoxy-5-benzoylaminobenzene | 2′-methoxybenzene-5′-(carbonyl-di-isobutylamine) | Red-violet. |
| 4 | 1-amino-4-benzoylamino-benzene | 2′-methoxybenzene - 5′ - (carbonyl-N (n) - butylphenylamine) | Red. |
| 5 | 1-amino-3-benzoylamino-benzene | 2′ - methoxybenzene - 5′ - (carbonyl-N(n) - butylphenylamine) | Do. |
| 6 | 1-amino-2-methoxy-5-methyl-4-benzoylamino-benzene | 2′-methoxybenzene-5′-(carbonyl-diethylamine) | Bordeaux. |
| 7 | 1-amino-2-methoxy-5-chloro-4-benzoylamino-benzene | 2′-methoxybenzene-5′-(carbonyl-n-dibutylamine) | Do. |
| 8 | 1-amino-2-methoxy-5-benzoylaminobenzene | 2′-methoxybenzene-5′-(carbonyl-n-dibutylamine) | Do. |
| 9 | 1-amino-2.5-dimethoxy-4-acetaminobenzene | 2′-methoxybenzene-5′-(carbonyl-n-dibutylamine) | Violet. |
| 10 | 1-amino-2.5-diethoxy-4-phenacetylaminobenzene | 2′-methoxybenzene-5′-(carbonyl-n-dibutylamine) | Do. |
| 11 | 1-amino-2.5-diethoxy-4-hexahydro-benzoylamino-benzene | 2′-methoxybenzene-5′-(carbonyl-n-dibutylamine) | Do. |
| 12 | 1-amino-2.5-diethoxy-4-(alpha-)naphthoylaminobenzene | 2′-methoxybenzene-5′-(carbonyl-n-dibutylamine) | Do. |
| 13 | 1-amino-2.5-diethoxy-4-benzoylaminobenzene | 4′-phenoxybenzene-5′-(carbonyl-n-dibutylamine) | Do. |
| 14 | ---do--- | 4′-methoxybenzene-5′-(carbonyl-n-dibutylamine) | Do. |
| 15 | ---do--- | 2′-chlorobenzene-5′-(carbonyl-N-piperidine) | Do. |
| 16 | ---do--- | Benzene-3′-(carbonyldicyclohexylamine) | Blue. |
| 17 | ---do--- | Benzene-3′-(carbonyl-n-dibutylamine) | Do. |
| 18 | ---do--- | Benzene-4′-(carbonyl-n-dibutylamine) | Do. |
| 19 | ---do--- | Benzene-4′-(carbonyldiethylamine) | Do. |
| 20 | ---do--- | Benzene-4′-(carbonyl-N-(n)butylphenylamine) | Do. |
| 21 | ---do--- | 2′-methylbenzene-5′-(carbonyl-N-(n)butylphenylamine) | Do. |
| 22 | ---do--- | 2′-methylbenzene-5′-(carbonyl-N-piperidine) | Do. |
| 23 | 1-amino-2-methoxy-5-methyl-4-benzoyl-aminobenzene | 2′-methylbenzene-5′-(carbonyl-n-dibutylamine) | Violet. |
| 24 | ---do--- | 2′-benzyloxybenzene-5′-(carbonyl-n-dibutylamine) | Bordeaux. |
| 25 | ---do--- | 2′.5′-dimethoxybenzene-4′-(carbonyl-n-dibutylamine) | Red-violet. |
| 26 | ---do--- | 2′.4′-dimethylbenzene-5′-(carbonyl-n-dibutylamine) | Violet. |
| 27 | 1-amino-2.5-diethoxy-4-benzoylaminobenzene | 2′-methoxybenzene-5′-(carbonyl-dibenzylamine) | Do. |
| 28 | ---do--- | 2′-methoxybenzene - 5′ - (carbonyl-N-ethyl-cyclohexylamine) | Do. |
| 29 | ---do--- | 2′-methoxybenzene-5′-(carbonyl-N - benzyl-cyclohexylamine) | Do. |
| 30 | 1-amino-4-ethoxy-5-acetaminobenzene | Benzene-3′-(carbonyl-dimethylamine) | Bordeaux. |
| 31 | 1-amino-2.5-diethoxy-4-benzoylaminobenzene | Benzene-4′-(carbonyl-N-methylbenzylamine) | Blue. |
| 32 | ---do--- | 2′-methylbenzene-5′-(carbonyl-diphenylamine) | Blue. |
| 33 | ---do--- | 2′-methoxybenzene-5′-(carbonyl-N-carbazole) | Violet. |
| 34 | 1-amino-3.5-dichloro-4-benzoylaminobenzene | Benzene-2′-(carbonyl-dibenzylamine) | Red. |
| 35 | 1-amino-4-hexahydro-benzoylaminobenzene | ---do--- | Do. |
| 36 | 1-amino-3-methyl-4-benzoylaminobenzene | Benzene-2′-(carbonyl-N-piperidine) | Do. |
| 37 | 1-amino-2-methoxy-5-methyl-4-benzoyl-aminobenzene | 2′-methoxybenzene-5′-(carbonyl-N-ethyl-1″-naphthylamine) | Bordeaux. |
| 38 | 1-amino-2.5-diethoxy-4-benzoylaminobenzene | 6-methoxy-2.3-hydroxy-naphthoyl-1′-amino-2′-methylbenzene-5′-(carbonyl-n-dibutylamine) | Blue. |
| 39 | ---do--- | 6-bromo-2.3-hydroxynaphthoyl-1′-amino-2′-methylbenzene-5′-(carbonyl-n-dibutylamine) | Do. |

The process may be conducted in the same manner with other bases or naphthols of the kind indicated above.

Since an object of the present invention is to provide dyestuffs of good fastness properties which dyestuffs are insoluble in water and alkalies, it is to be understood that the aromatic nuclei of the general formulae appearing in the appended claims, do not contain any substituents which are known to render organic compounds soluble in water or alkalies and to tend to depreciate the fastness of the dyestuffs to alkalies. Substituents of this kind are, for instance, the sulfonic acid and the carboxylic acid group.

I claim:
1. The water-insoluble mono-azo-dyestuffs of the following general formula

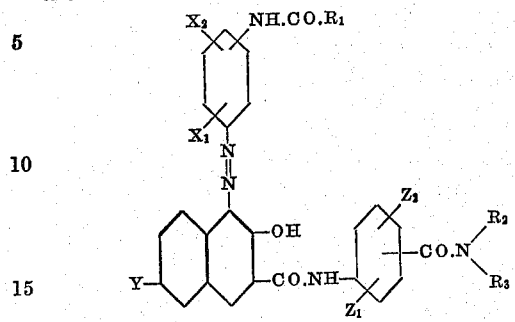

wherein the group —NH.CO.R₁ stands in one of the positions meta and para to the azo-group, X₁ and X₂ stand for members of the group consisting of hydrogen, alkyl, alkoxy, and halogen, R₁ stands for a member of the group consisting of methyl, benzyl, radicals of the benzene and naphthalene series and a hydroaromatic radical, R₂ and R₃ stand for members of the group consisting of alkyl, benzyl, radicals of the benzene and naphthalene series and hydroaromatic radicals which may be connected to form a heterocyclic ring system, Y stands for a member of the group consisting of hydrogen, alkoxy and halogen, Z₁ for a member of the group consisting of hydrogen, alkyl, alkoxy, benzyloxy, phenoxy and halogen and Z₂ for a member of the group consisting of hydrogen, alkyl and alkoxy, being insoluble in water, but very easily soluble in organic solvents and yielding red to blue shades of good properties of fastness.

2. The water-insoluble mono-azo-dyestuffs of the following general formula

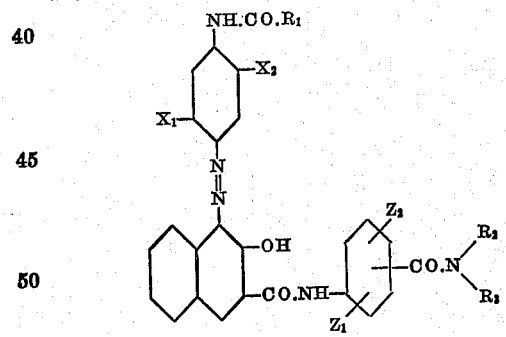

wherein X₁ and X₂ stand for members of the group consisting of hydrogen, alkyl, alkoxy and halogen, R₁ stands for a member of the group consisting of methyl, benzyl, radicals of the benzene and naphthalene series and a hydroaromatic radical, R₂ and R₃ stand for members of the group consisting of alkyl, benzyl, radicals of the benzene and naphthalene series and hydroaromatic radicals which may be connected to form a heterocyclic ring system, Z₁ stands for a member of the group consisting of hydrogen, alkyl, alkoxy, benzyloxy, phenoxy and halogen and Z₂ for a member of the group consisting of hydrogen, alkyl and alkoxy, being insoluble in water, but very easily soluble in organic solvents and yielding red to blue shades of good properties of fastness.

3. The water-insoluble mono-azo-dyestuff of the following formula

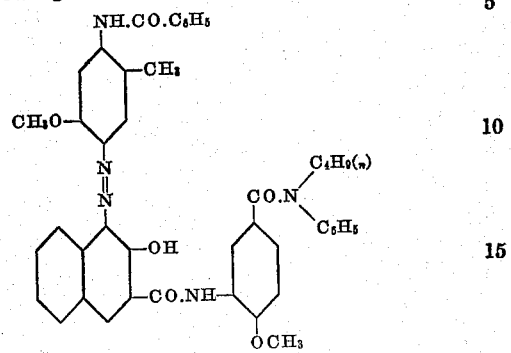

being a red powder which dissolves easily in organic solvents, such as butyl alcohol, butyl acetate, acetone, xylene and colors, for instance, cellulose ester lacquers vivid Bordeaux-red tints of good properties of fastness.

4. The water-insoluble mono-azo-dyestuff of the following formula

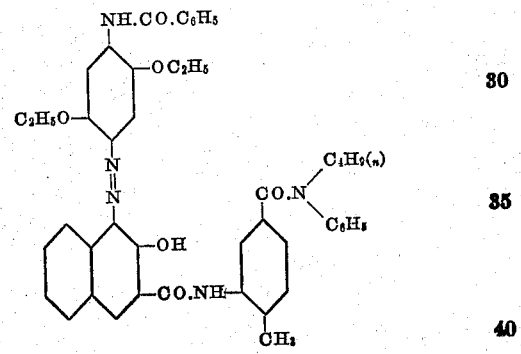

being a blue powder which dissolves easily in organic solvents, such as butyl alcohol, butyl acetate, acetone, xylene and colors, for instance, cellulose ester lacquers vivid blue tints of good properties of fastness.

5. The water-insoluble mono-azo-dyestuff of the following formula

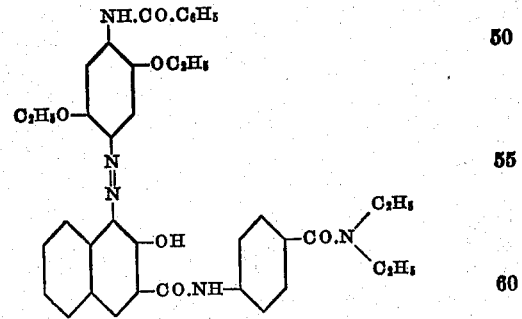

being a blue powder which dissolves easily in organic solvents, such as butyl alcohol, butyl acetate, acetone, xylene and colors, for instance, cellulose ester lacquers vivid blue tints of good properties of fastness.

ERNST FISCHER.